ELUTION OF ANIONIC EXCHANGE RESIN WITH 2N HCl

INVENTORS.
RAY S. LONG
RICHARD H. BAILES
BY
ATTORNEY.

ELUTION OF ANIONIC EXCHANGE RESIN WITH 2M H₂SO₄

EFFECT OF H₂SO₄ AND SO₄⁻² CONCENTRATION
ON ELUTION OF U FROM ANIONIC EXCHANGE RESIN

INVENTORS.
RAY S. LONG
RICHARD H. BAILES
BY
Roland A. Anderson
ATTORNEY.

SERIES CASCADE ELUTION OF ANION EXCHANGE RESIN (Four Columns)

THE EFFECT OF REDUCING AGENTS ON THE ELUTION
OF U FROM ANIONIC EXCHANGE RESIN

INVENTORS.
RAY S. LONG
RICHARD H. BAILES
BY
Roland A. Anderson
ATTORNEY.

United States Patent Office 2,770,520
Patented Nov. 13, 1956

2,770,520

RECOVERY OF URANIUM FROM PHOSPHORIC ACID AND PHOSPHATE SOLUTIONS BY ION EXCHANGE

Ray S. Long, Solano, and Richard H. Bailes, Walnut Creek, Calif., assignors to the United States of America as represented by the United States Atomic Energy Commission Application April 11, 1950, Serial No. 155,307

9 Claims. (Cl. 23—14.5)

The present invention relates to processes for the recovery and purification of uranium. More particularly, it relates to an anionic exchange process for the recovery of uranium from phosphoric acid or other phosphatic solutions, such as those obtained during the manufacture of phosphate fertilizers.

It has long been known that crude phosphate ores contain minute amounts of uranium, but, heretofore recovery of uranium from such material was not economically feasible. Despite the low uranium concentrations present in such phosphate ores, an appreciable quantity of uranium may be made available by suitable treatment of the tremendous quantities of phosphate ores which are mined annually in the production of industrial phosphoric acid and phosphate fertilizers.

Usually, in these processes, the phosphate ore is leached with sulfuric acid to yield a concentrated acidic phosphate or phosphoric acid solution. Uranium is normally quite soluble in such solutions and the problem of recovering the uranium is complicated by the high phosphate concentration. Now it has been found that uranium may be recovered from solutions of this nature by oxidizing the uranium to the uranyl state whereupon a uranyl phosphate anion is formed which anion may be selectively adsorbed upon an anionic exchange resin and selectively eluted from the resin thereby effecting a concentration and purification of the uranium. Moreover, it has been found that the principle of producing a uranyl complex anion in the solution may be applied to the recovery of uranium from a variety of materials by producing therefrom a solution containing uranyl complex anions including the phosphate and chloride complex anions.

An object of the invention is to recover uranium from various materials by producing a solution thereof containing uranyl complex anions and adsorbing said anions on an anionic exchange resin.

An important object of the present invention is to provide efficient and practical processes for the recovery of uranium from crude phosphate or phosphoric acid solutions.

Another object of the invention is to provide processes for the recover of uranium from crude phosphatic solutions without impairment of the phosphatic solutions for further use in industrial and agricultural processes.

Still another object of the invention is to provide uranium recovery processes wherein the uranium present in crude phosphatic solutions is adsorbed by an anionic exchange resin as an anionic uranium phosphate complex.

Another object of the invention is to provide efficient eluting agents for uranium which has been adsorbed by an anionic exchange resin in processes for recovering uranium from crude phosphatic solutions.

Other objects and advantages will be apparent from the following description considered together with the accompanying drawing, in which.

Figure 1:
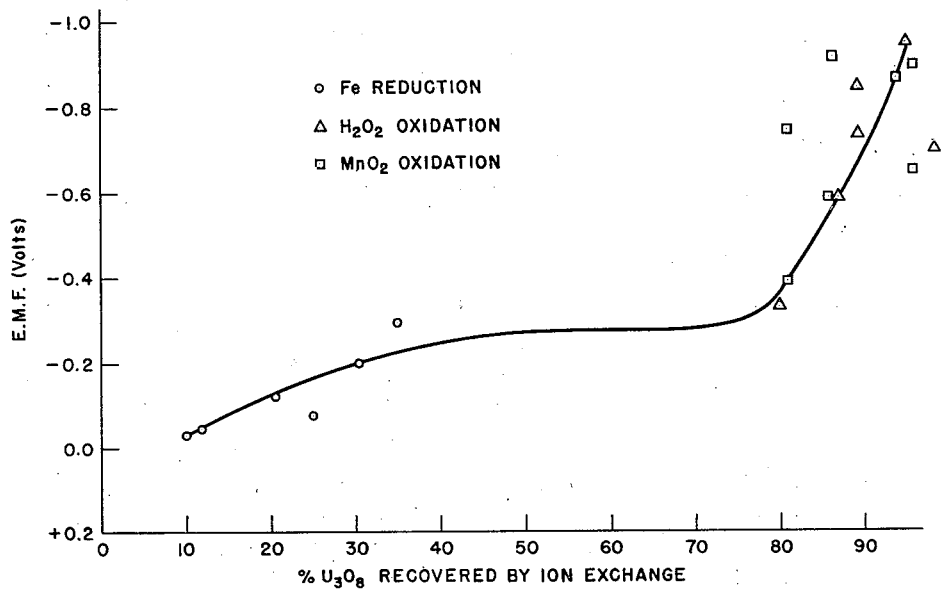
Figure 1 is a graph illustrating the recovery of uranium by an anionic exchange resin as a function of the degree of oxidation expressed as electromotive potential of the solution from which the uranium is adsorbed by the resin.

It has been known for some time that certain resins exhibit very pronounced and selective adsorption properties for a variety of ionic substances. Such resins are termed "ion exchange resins" and are, essentially, resinous materials which possess numerous reactive groups capable of exchanging their ionizable components for other ions of the same sign under suitable conditions. Ion exchange resins are further classified as cationic and anionic exchange resins according to whether they exchange cations or anions respectively.

Anionic exchange resins, which are particularly suited for use in the processes of the present invention, comprise a stable resin which possesses numerous reactive amine, quaternary ammonium, or substituted guanidine groups in which the ionizable component X (e. g. $Cl^-$, $SO_4^=$, $OH^-$, etc.) is capable of being replaced by other anionic species. Anionic exchange resins which are of the "strong base type," i. e., those which possess quaternary ammonium reactive groups, have been found to be most effective in the processes of the present invention and are preferred. Dowex 1 and Dowex 2, strongly basic anionic exchange resins, employed in various of the illustrative examples set forth hereinafter, are stated by the manufacturer to be equivalent in function and substantially the same. These materials are manufactured by procedures which are substantially the same as those described in Examples 2 and 4 of U. S. Patent No. 2,614,099 filed December 29, 1948, and issued October 14, 1952.

In general, the separation processes of the present invention comprise adsorbing at least the desired ions from the solution and upon an anionic exchange resin and thereafter selectively eluting the ions from the resin. More specifically a solution containing the materials to be separated in ionic form is passed through a column of finely divided resin under such conditions that the desired ions are removed from the solution by adsorption upon the resin. A solution, characterized by its ability to elute adsorbed ions from the resin at differential rates as by forming complexes of differing stability with each ion (or more generally stated, capable of differentially shifting the resin-solution equilibrium of the adsorbed ions in favor of the solution) is then passed through the column. Since, in such a system, there will exist a competition between the reactive groups of the resin and the eluting solution for each ion specie, providing the eluction is not performed too far from equilibrium conditions (i. e., the flow rate of the elutriant is not too high), each ion will go through many successive adsorptions and dissolutions as it passes down the column. In this respect, the operation of an ion exchange column may be considered to be analogous to the operation of an efficient fractionating column wherein the many equilibrium stages give a large enough magnification of minute differences in physical or chemical effects to make possible the separation of components with almost identical properties. The rate at which each of the ions moves down the column upon elution will, in general, depend upon the stability of the resin-ion bond relative to the stability of an ion of the material in the eluting solution. Since these stabilities are different for various of the adsorbed ions, separation of the different ions into substantially monochromatic bands will be effected as they travel down the column. Separate fractions of the eluting solution, each enriched in a particular constituent, may thus be collected. Moreover, the nature of the eluting agent and the conditions of operation of the column have been found to be specific and critical with respect to the recovery of uranium.

As noted previously, the different component ions are separated from each other in monochromatic bands upon elution from the column and consequently particular fractions of the eluting solution issuing from the resin column contain the desired materials in concentrated form. It is thus readily apparent that the ion exchange separation processes possess the important property of concentrating a particular component as well as separating it from other components. This property is employed to advantage in the recovery of minute amounts of uranium from materials which are treated in accordance with the present invention. These materials may comprise in general ores, or industrial solutions such as those crude or commercial grade phosphatic or phosphoric acid solutions which are obtained during the manufacture of phosphate fertilizers from phosphate rock. The processes of the invention are particularly adapted to the recovery of uranium from those phosphatic solutions which are approximately 25–35% $H_3PO_4$. For illustrative purposes, there is listed in table I, below, a typical analysis of such an acid solution. It will be appreciated that the composition of such solutions, both as to relative amounts and as to the particular impurities present, may vary somewhat from the specific values shown without rendering the present process inoperative.

TABLE 1

| | | |
|---|---|---|
| $U_3O_8$ | mg./l. | 105 |
| $H_3PO_4$ | g./l. | 330 |
| V | g./l. | 1.48 |
| Fe | g./l. | 3.02 |
| Ca | percent | 0.155 |
| Mg | do | 0.20 |
| Al | do | 0.34 |
| F | do | 1.13 |
| $SO_4$ | do | 1.22 |
| Sp. Gr. | | 1,207 |

It has been found that in such phosphate solutions the uranium present, when oxidized to the VI oxidation state, is complexed by the phosphate present to form an anionic species which may be adsorbed on an anionic resin. This principle may be applied to the recovery of uranium in general by supplying appropriate quantities of an anionic complexing agent to solutions deficient in this respect and then treating the solutions in accordance with the invention. Chloride ions, if present in concentrations above about 3 N are also suitable as complexing agents and perform in a similar fashion to the phosphate.

More particularly, in accordance with the invention, the solution is oxidized to place the uranium in the VI oxidation state whereupon uranyl complex anions are formed in the solution with complexing agents present or which are added to the solution and then the oxidized acid is passed through a column of anionic exchange resin whereupon the uranium and certain other anionic materials are adsorbed by undergoing ion exchange with the replaceable anions of the resin. Since the various cationic materials present in the solution are not adsorbed by the anionic exchange resin, the adsorbed uranium is effectively separated from these materials which remain in the solution. In the event that the original solution is deficient with respect to the complexing agent appropriate amounts of such an agent are supplied to the solution either before, during or after the oxidation. Phosphate itself is not strongly adsorbed by these anionic exchange resins and amounts equivalent to only a few percent of the total amount of phosphate in the solution are adsorbed by the resin. Accordingly, the uranium is selectively adsorbed by the resin and an almost complete separation of the uranium from the phosphate is achieved during the adsorption which separation can be made substantially complete by selective elution as described hereinafter.

The oxidation of the uranium present in the crude phosphate solutions to the VI oxidation state may be effected with a variety of chemical oxidizing agents, e. g., hydrogen peroxide, manganese dioxide and chlorate salts, by passing air through the solutions or, alternatively, electrolytic oxidation may be employed. The degree of oxidation may be easily determined by electrometrically following the progress of the oxidation by determining the potential developed between a platinum and a standard calomel electrode immersed in the solution. With reference to Fig. 1, which comprises a graph of the potential of the solution versus the amount of uranium recovered from the exchange resin, it is apparent that the amount of uranium which may be recovered is critically dependent upon the degree of oxidation. For example when the E. M. F. of the solution is −0.5 volt the recovery is about 85% while the recovery is about 95% when the E. M. F. is about −0.9 volt. It is to be noted that the low points on the graph represent the reduction of the phosphate solution with metallic iron. Thus the importance of having the uranium present in the VI oxidation state when it is to be adsorbed with high efficiency is clearly apparent. These measurements were made on industrial phosphoric acid solutions of the type indicated above and therefore measurements on other solutions necessarily require suitable corrections to correspond to the above mentioned potentials.

The uranium adsorbed by the resin, may be selectively eluted and concentrated with various eluting agents with appropriate modification of the process. Eluting agents which have given satisfactory recoveries of uranium are dilute hydrochloric, nitric, and sulfuric acids, mixtures of dilute sulfuric acid with sulfates, chloride solutions, chloride solutions preceded by treatment with sulfur dioxide gas, dilute sulfuric acid solutions containing hydrazine and hydroxylamine salts, and hydrogen sulfide gas in conjunction with dilute sulfuric acid.

As the hydrochloric acid concentration is raised to about 5 N or chloride concentration in an eluriant solution is raised to about 4 or 5 N, the stability of the uranyl complex anion in the solution becomes relatively low compared to the stability of the complex anion adsorption upon the resin. Accordingly, when the chloride concentration is above the values indicated uranyl chloride complex anions are adsorbed from such a solution when contacted with a regenerated anionic exchange resin. Specific details of the operation of the various modifications of the process will become apparent from the following examples which set forth the actual conditions and procedures followed in the operation of various modifications of the invention. It may be mentioned that such variables as flow rates during adsorption and elution, the length and diameter of the resin column, and mesh size of the resin have been found to bear only a secondary effect on the separations achieved, i. e., their effect will always be negligible when the adsorption and elution steps are operated at or near equilibrium conditions. It has also been found that performing the elution step at an elevated temperature, e. g., 60° C., narrows the range in which the uranium appears in the effluent and increases the uranium concentration.

The effluent fractions containing uranium are relatively free of interfering cationic and anionic materials, accordingly, a very high grade of uranium tetrafluoride can be precipitated from the effluent solutions by adding excess hydrogen fluoride solution after reduction. Other precipitants may likewise be employed to yield other high grade uranium compounds. In the following examples, the amount of uranium present is expressed in terms equivalent to the weight of $U_3O_8$ obtained upon analysis. Accordingly, reference to quantities of $U_3O_8$ contained in a material is to be interpreted as indicating an equivalent quantity of uranium in the appropriate form or state as indicated by context.

In one embodiment of the invention, uranium contained in a phosphate solution similar to that described above is oxidized to the VI oxidation state, and the oxidized solution is contacted with an anionic exchange resin in the chloride form whereby the uranium is adsorbed thereon. When the resin is in the sulfate form, substantially the same results are obtained. The uranium is then selectively eluted from the resin with a hydrochloric acid solution having a concentration in the range of about 1–5 N. As the concentration of the hydrochloric acid in the elutriant is raised to 5 N, the peaks of the uranium elution curves (i. e., the maximum concentrations of the uranium in the elutriant) fall off steadily indicating the relatively low stability of uranyl complex anions in the more concentrated hydrochloric acid solutions.

This embodiment is illustrated by the following specific example:

Example 1

One liter of oxidized phosphoric acid solution (32% $H_3PO_4$) containing uranium equivalent to 108 mg. $U_3O_8$ was passed at an average flow rate of 12.8 ml./min./in.² through a resin column, 18.5″ long and 1″ in diameter, filled with 150 g. of 10 mesh Dowex 1 resin (a quaternary ammonium type) in the chloride form. The characteristic adsorption of the uranium from the acid solution by the resin is shown in Table 2:

TABLE 2

| Acid effluent, ml. | $U_3O_8$ in Effluent (mg./100 ml.) | Adsorption, $U_3O_8$, percent |
| --- | --- | --- |
| 100 | 0.566 | 95 |
| 200 | 1.77 | 84 |
| 300 | 3.64 | 66 |
| 400 | 4.39 | 59.5 |
| 500 | 5.88 | 45 |
| 600 | 5.90 | 45 |
| 700 | 6.51 | 40 |
| 800 | 8.10 | 25 |
| 900 | 8.05 | 25 |
| 1,000 | 7.92 | 26 |

Figure 2:
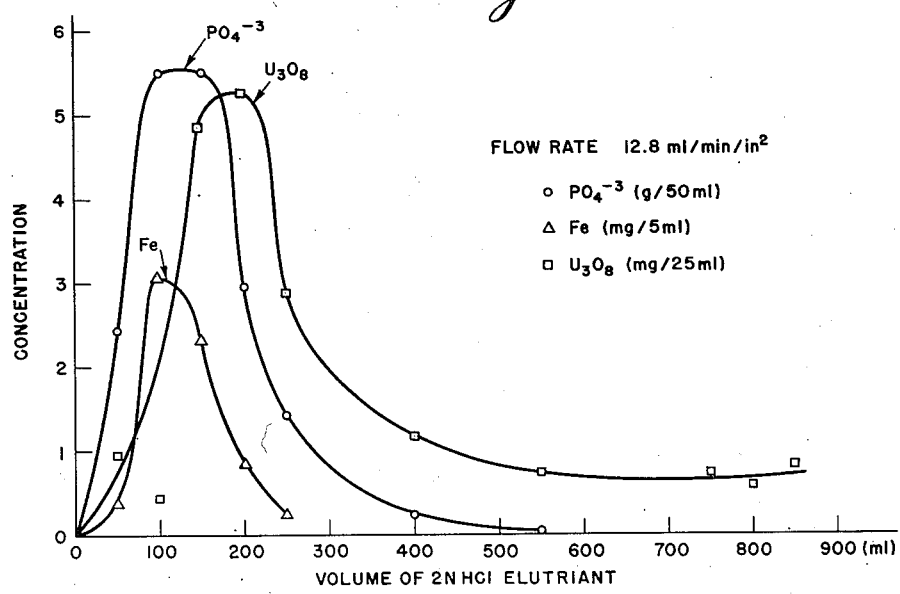
Fig. 2 is a graph illustrating the elution of uranium and phosphate from an anionic exchange resin with hydrochloric acid.

The column was then eluted with 2N HCl at the same flow rate as that employed during adsorption. Fig. 2 shows the manner in which the iron, phosphate and uranium are partitioned into substantially monochromatic bands by the eluting solution. The peaks of the iron and phosphate concentration occur approximately with the passage of the second 50 ml. portion of the 2 N HCl effluent while the peak of the uranium curve occurs with the passage of the fourth 50 ml. portion of the elutriant. Nearly half of the uranium is found in the portion of the hydrochloric acid effluent between 100 and 300 ml. with the phosphate concentration having been reduced from about 420 g./l. to 20 g./l.

In another embodiment of the invention, sulfuric acid solutions may be used as elutriants for the adsorbed uranium. It has been found that progressively better elutions of the uranium are obtained when the concentration of the $H_2SO_4$ is increased up to 2 molar. At concentrations above 2 molar, and up to 6 molar, very little difference in the elution has been observed.

This embodiment is illustrated by the following specific example:

Example 2

1200 ml. of oxidized phosphoric acid (32% $H_3PO_4$) containing uranium equivalent to 91 mg. of $U_3O_8$/l. were passed through a column, 27″ long and 1″ in diameter, filled with 300 g. of 100 mesh Dowex 2 resin (a quaternary ammonium type) in the sulfate form at a flow rate of 13 ml./min./in.². The progress of the uranium adsorption is shown in Table 3.

TABLE 3

| Acid Effluent, ml. | $U_3O_8$ in Effluent, mg./100 ml. | Adsorption, $U_3O_8$, percent |
| --- | --- | --- |
| 100 | 0.00 | 100 |
| 200 | 0.043 | 99 |
| 500 | 0.385 | 95.8 |
| 600 | 0.650 | 93 |
| 800 | 2.565 | 72 |
| 1,000 | 2.96 | 67.4 |

Figure 3:
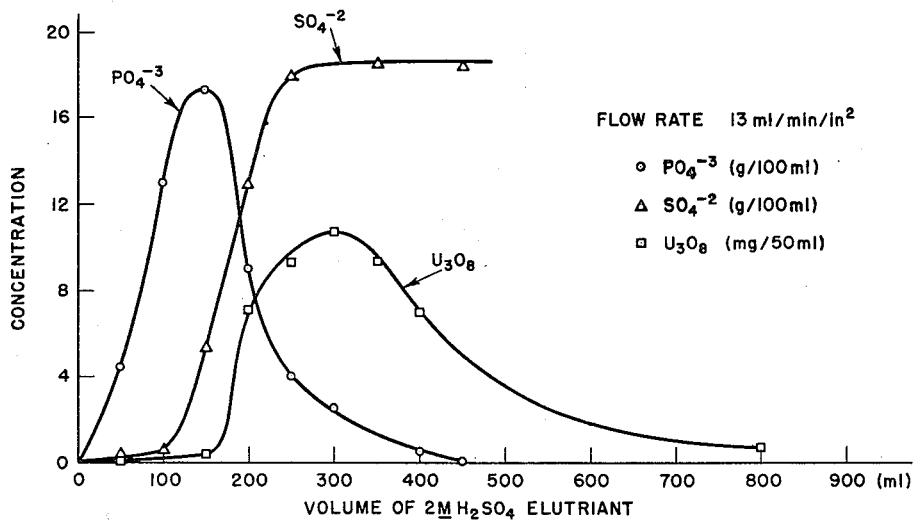
Fig. 3 is a graph illustrating the elution of uranium and other components from an anionic exchange resin with sulfuric acid.

Fig. 3 illustrates the elution curve obtained upon elution with 2 M sulfuric acid at approximately the same flow rate as the adsorption. The elution of sulfate, phosphate, fluoride and uranium anions are plotted.

With reference to the sulfate plot, it will be noted that the sulfate does not reach a high concentration until after most of the phosphate has passed out of the column. In a practical sense this means that the first portion of the effluent is substantially uncontaminated phosphoric acid and can be returned to the original acid. The resin at the end of the elution is once again in the sulfate form and prepared for further treatment of uranium-bearing phosphatic solutions.

The sulfuric acid elutriant of the embodiment above may be combined with a sulfate elutriant to obtain a more efficient separation and recovery of the uranium. This modification of the invention is illustrated by the following specific example:

Example 3

Columns of Dowex 1 resin (a quaternary ammonium type) were contacted with an oxidized phosphoric acid solution similar in composition to that indicated above to adsorb uranium thereon and the uranium was then eluted with various solution mixtures of sulfuric acid with sodium sulfate.

Figure 4:
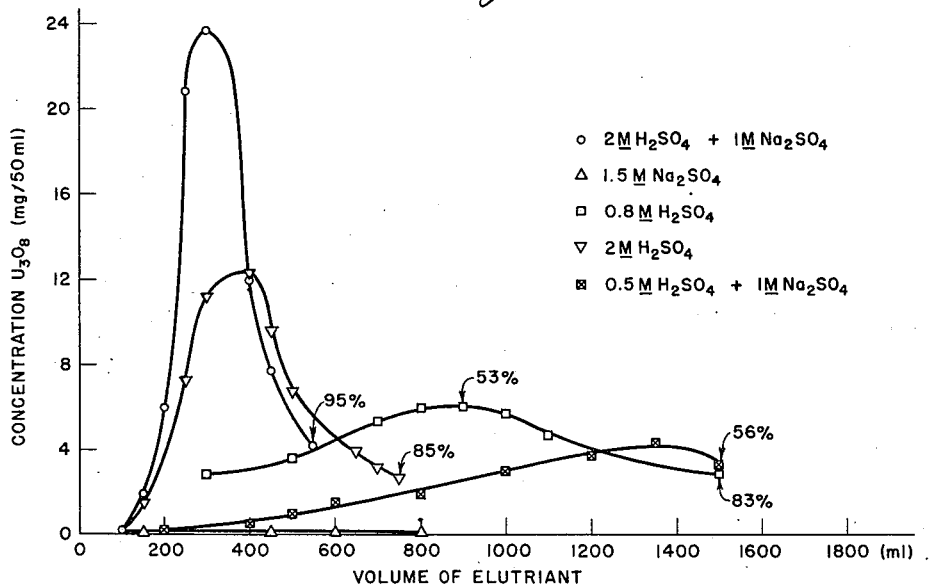
Fig. 4 is a graph illustrating the elution of uranium from an anionic exchange resin with various aqueous sulfuric acid-sulfate mixtures.

The family of elution curves indicating the results when sulfuric acid and sulfate concentrations are the only variables (the flow rates and column geometry having been held constant) are plotted in Fig. 4. The percentages noted thereon represent the cumulative total amounts of uranium eluted from the resin. The peak of each of the elution curves represents about 50% elution. Using 2 M sulfuric acid which is also 1 M with respect to sodium sulfate, this peak occurred at about 300 ml. with an uranium concentration of about 500 mg./l. For 2 M sulfuric acid the peak is at 400 ml. Progressively larger amounts of elutriant are necessary as the molarity of sulfuric acid is reduced to 0.8 M and 0.5 M, reaching peaks at 900 ml. and 1350 ml. respectively. Almost no uranium was eluted by 1000 ml. of 1.5 M sodium sulfate, although almost twice as much sulfate was present as in 0.8 M sulfuric acid which eluted about 60% of the uranium when 1000 ml. had been passed through the resin. It is thus seen that the hydrogen ion concentration is critically related to the total sulfate concentration in determining the efficiency of the elution of the uranium.

In another embodiment of the invention, it has been found possible to further increase the uranium concentration in the elutriant by passing the effluent of one column through successive resin columns saturated with respect to uranium. Each cycle enhances the concentration of the uranium until either the desired concentration is reached or the maximum equilibrium value is obtained. The following example is illustrative of this embodiment of the invention with respect to sulfuric acid elution.

Example 4

Figure 5:
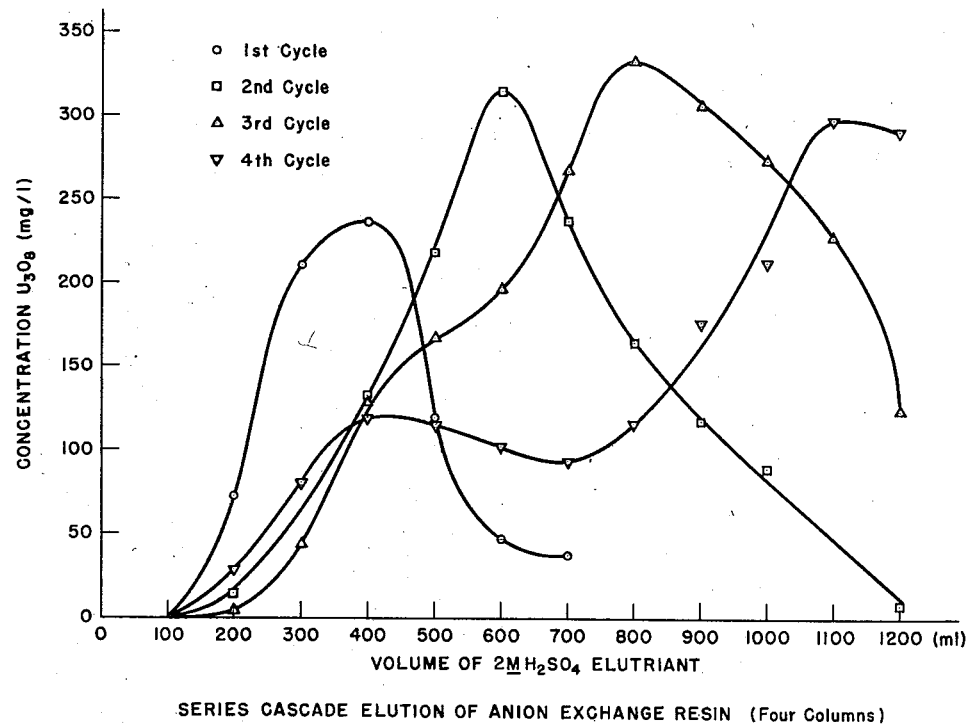
Fig. 5 is a graph illustrating the cyclic elution of uranium from an anionic exchange resin.

Four 300 g. columns of Dowex 1 resin (a quaternary ammonium type) were each saturated with respect to uranium by contact with 2 liters of oxidized 30% $H_3PO_4$ solution containing uranium. The first column was then eluted with 1200 ml. of 2 M sulfuric acid and successive 100 ml. portions were collected. From each of these portions, 5 ml. aliquots were withdrawn for uranium analysis. Since the first portions of the effluent are depleted with respect to sulfate the 5 ml. aliquots of the first three 100 ml. elutriant portions were replaced by an equivalent volume of sulfuric acid in an attempt to increase the sulfate concentration to 1 M or more. The portions from the first column were then successively added to the next column of saturated resin. The level of liquid in the column was lowered to the resin level before each sample addition to prevent excessive mixing. Results of the analysis of the effluents from each of the four columns are presented in Fig. 5. The peak concentration of uranium equivalent to 235 mg. $U_3O_8$/l. from the first column appeared after about 400 ml. of acid had passed through. In the second column, the peak concentration mounted to 310 mg./l. In the third column, the peak concentration rose to greater than 300 mg./l. The peak concentration of the fourth column effluent was approximately the same as that of third indicating that the maximum equilibrium value for the uranium concentration was achieved in the third column effluent.

In this example, it is believed that the peaks move progressively to the right because insufficient compensatory $H_2SO_4$ was added to the earlier samples to return the concentration to the original 2 M which concentration had been lowered by loss to the resin. Therefore, the actual elution with 2 M sulfuric acid began about 300 ml. later each time.

In another embodiment of the invention various adjunct reducing agents are employed in conjunction with sulfuric acid as eluting agents for the uranium as is illustrated in the following example.

Example 5

Three columns 1" in diameter and 34" in length containing 10 to 20 mesh Dowex 2 resin (a quaternary ammonium type) in the sulfate form, were saturated with uranium by the passage of 3 liters of oxidized phosphoric acid through each column.

Figure 6:
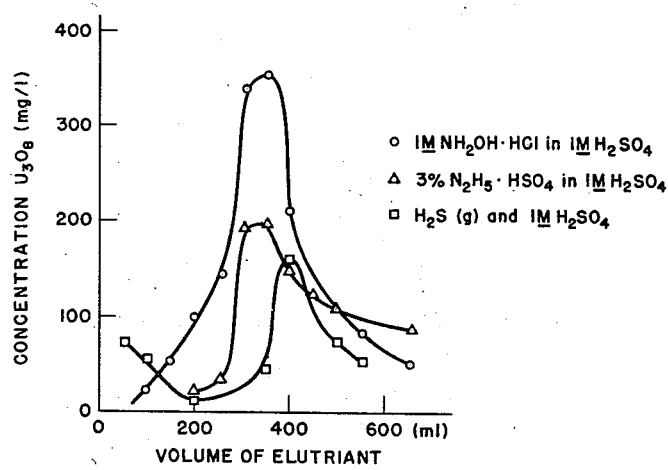
Fig. 6 is a graph illustrating the elution of uranium from an anionic exchange resin with various adjunctive eluting agents.

These columns were then eluted with one of the following elutriants: 1 M hydroxylamine hydrochloride in 1 M sulfuric acid; 3% hydrazine hydrosulfate in 1 M sulfuric acid; and hydrogen sulfide gas followed by 2 M sulfuric acid. In the last named elution, the column was allowed to drain and the resin was treated with hydrogen sulfide gas before elution with the 2 M sulfuric acid. The results of these elutions are shown in Fig. 6.

In another embodiment of the invention uranium is adsorbed as a uranyl chloride complex anion on an anionic exchange resin and is eluted with water. The following example is illustrative of this process.

Example 6

Small resin beds 1" in diameter and 2" in height containing 25 g. of wet Dowex 1 resin (a quaternary ammonium type), in the chloride form were each contacted with 1 liter of 1 M, 3 M and 5 M, sodium chloride solutions containing uranium equivalent to 4.2 g./l. of $U_3O_8$. Practically no uranium was adsorbed from the 1 M sodium chloride solution, while the resin adsorbed 4% of its own weight of uranium from the 3 M solution and 15% by weight of $U_3O_8$ was adsorbed by the resin from the 5 M solution. All of the uranium was removed from the resin treated with the 5 M solution with only 60 ml. of distilled water, the solution having a concentration of 133 g./l. of $U_3O_8$.

A dilute chloride solution having a concentration below about 1–2 M similarly could be employed as an elutriant, however, contamination with chloride is somewhat higher in this case.

Example 7

Identical columns of a quaternary ammonium type resin was saturated with respect to uranium by contact with oxidized phosphoric acid having a composition similar to that indicated above. The adsorbed uranyl phosphate complex anion adsorbed on one of the columns was then converted, presumably, to uranyl sulfite by contact with sulfur dioxide gas. Then, 1 M sodium chloride solution was employed to elute the uranium from this column and from the untreated columns. It was found that the elution band from the sulfur dioxide treated column was much more sharply defined than that obtained from the untreated columns.

In the present application it is intended that the terms employed have the following meanings:

The term "effluent" or its equivalent is intended to include any material coming off of an ion exchange column.

The term "eluting agent" or its equivalent is intended to include any substance which removes material from an ion exchange column.

The term "adsorption" is utilized in referring to removal of materials from solution by an ion exchange resin.

While the invention has been described with reference to particular embodiments and with reference to specific examples, it will, of course, be apparent that numerous modifications may be made therein within the spirit and scope of the invention and it is intended to cover all such that fall within the scope of the appended claims.

What is claimed is:

1. In a method for recovering uranium values from a phosphoric acid solution, the steps comprising oxidizing said uranium in solution to the VI oxidation state, whereby uranyl phosphate complex anions are formed therein, contacting the oxidized solution with an anionic exchange resin to adsorb said uranyl complex anions thereon, and then eluting adsorbed uranium from said exchange resin with an acidic solution and an adjunct reducing agent.

2. In a method for recovering uranium values from a phosphatic solution, the steps comprising oxidizing said uranium in solution to the VI oxidation state, whereby uranyl phosphate complex anions are formed therein, contacting the oxidized solution with an anionic exchange resin to adsorb said uranyl complex anions thereon, contacting said adsorbed uranium with gaseous hydrogen sulfide, and then eluting said adsorbed uranium with an acidic solution.

3. The method as defined in claim 2, wherein said acidic solution is a sulfuric acid solution.

4. The method as defined in claim 2, wherein said acidic solution comprises a hydrochloric acid solution.

5. In a method for recovering uranium from a solution, the steps comprising oxidizing the solution to yield uranyl ions therein, adding chloride to the solution to yield a concentration above about 5 M chloride thereby producing uranyl chloride complex anions therein, contacting the solution with an anionic exchange resin to adsorb said anions from the solution, and selectively eluting adsorbed uranium from said resin with a chloride solution having a concentration less than about 1 M.

6. In a method for recovering uranium from a phosphatic solution, the steps comprising producing uranyl phosphate complex anions therein, adsorbing said uranyl complex anions from said solution by contact with an anionic exchange resin, contacting the uranyl phosphate complex anions adsorbed on said resin with sulfur dioxide gas to convert said phosphate complex anion to a uranyl sulfite compound, and then selectively eluting uranium from said resin with a dilute chloride solution.

7. In a method for recovering uranium values from a phosphoric acid solution, the steps comprising oxidizing said uranium in solution to the VI oxidation state, whereby uranyl phosphate complex anions are formed therein, contacting the oxidized solution with an anionic exchange resin to adsorb said uranyl complex anions thereon, and then eluting adsorbed uranium from said exchange resin with an acidic solution and an adjunct reducing agent selected from the group consisting of hydroxylamine, hydrazine and hydrogen sulfide.

8. In a method for recovering uranium values from a solution containing a material selected from the group consisting of phosphate and chloride, the steps comprising treating said solution to place the uranium in the VI oxidation state, whereby anionic exchange adsorbable uranyl complex anions are formed therein, contacting the treated solution with an anionic exchange resin to adsorb said uranyl complex anions thereon, and selectively eluting uranium from said resin with a solution containing an agent selected from the group consisting of dilute hydrochloric acid; dilute nitric acid; dilute sulfuric acid; chloride; acidic sulfate; $SO_2$ gas followed by chloride solution; sulfuric acid and a hydrazine salt; sulfuric acid and a hydroxylamine salt; and sulfuric acid with $H_2S$ gas.

9. The process as otherwise defined in claim 8 but wherein said agent by which the uranium is selectively eluted comprises a sodium chloride solution of less than about 4 M concentration.

References Cited in the file of this patent

Rimbach, Berichte der deutschen chemischen Gesellschaft, volume 37, pages 461–487 (1904). Copy in Scientific Library.

Friend, Textbook of Inorganic Chemistry, volume 7, part 3, page 331 (1926). Copy in Scientific Library.

Sussman et al.: Metal Recovery by Anion Exchange, Industrial and Engineering Chemistry, volume 37, pages 618–624 (1945).